T. A. EDISON.
STORAGE BATTERY ELECTRODE AND THE PRODUCTION OF SAME.
APPLICATION FILED SEPT. 5, 1919.

1,402,751.  Patented Jan. 10, 1922.

Witnesses:

Inventor:
Thomas A. Edison
By Dyer & Holden
his Attys

UNITED STATES PATENT OFFICE.

THOMAS A. EDISON, OF LLEWELLYN PARK, WEST ORANGE, NEW JERSEY.

STORAGE-BATTERY ELECTRODE AND THE PRODUCTION OF SAME.

1,402,751. Specification of Letters Patent. Patented Jan. 10, 1922.

Application filed September 5, 1919. Serial No. 321,933.

*To all whom it may concern:*

Be it known that I, THOMAS A. EDISON, a citizen of the United States, and a resident of Llewellyn Park, West Orange, Essex County, New Jersey, have invented certain new and useful Improvements in Storage-Battery Electrodes and the Production of Same, of which the following is a description.

My invention relates to storage battery electrodes and more particularly to those designed for use in storage batteries of the Edison type, wherein nickel hydroxide as the active material for the positive elements is opposed to electrolytically active iron as the active material for the negative elements in an alkaline solution; and the principal object of the invention is to provide an improved form of electrode element whereby a cell in which such elements are assembled will have a high discharge rate.

In general, my invention resides in an improved form of electrode element which, when assembled in the cell, will result in a great decrease in the internal resistance of the cell, and consequently in a corresponding increase in the discharge rate thereof, and also in an improved method and means of producing such an element.

More specifically described, my improved electrode element consists of a thin metallic plate or sheet having electrolytically deposited over the entire surface thereof a thin coating or film of a hydroxide of a suitable metal, preferably nickel hydroxide, the entire sheet preferably being provided with small and closely adjacent perforations therethrough, whereby the film or coating will be securely fastened or clinched to the sheet by its engagement with the outer surface of the sheet and with the walls of the perforations therethrough.

I have discovered that under certain conditions a film or coating of a hydroxide of a metal can be electrolytically deposited on a member employed as a cathode in an electrolytic cell in which the electrolyte consists of a solution of a material comprising or containing a salt of such metal; and in its broader aspects my invention consists in a member provided with such a film or coating and in the method and means of producing the same.

My copending application, Serial No. 518,181 filed November 28, 1921, is a division of the present application and contains claims directed to an improved electrolytic cell for producing elements or members having electrolytically deposited surface coatings or films such as referred to above.

In producing positive electrode elements for nickel iron alkaline storage batteries in accordance with my invention, I preferably employ a plurality of nickel-plated thin plates or sheets of steel as cathodes opposed to and respectively disposed between anodes consisting of solid nickel in a solution of nitrate of nickel or a solution of a mixture of a nickel salt and an oxidizing and plating agent, such as a mixture of nickel sulphate and approximately 10% of a nitrate such as nitrate of soda, as the electrolyte. On passing a current through such cell, thin semi-transparent films or coatings of nickel hydroxide, instead of films of metallic nickel as would naturally be expected, are deposited on the cathodes. I find that improved plating of the nickel hydroxide on the cathodes results when the nickel plating solution contains approximately 10% of a nitrate salt. The nickel plated steel plates or sheets are each preferably provided with closely adjacent perforations and the film of nickel hydroxid deposited thereon will consequently tenaciously adhere or be securely clinched to the sheet, as described above, so that it will be practicable to employ the same as an electrode element of a storage battery cell. After films of nickel hydroxide of the desired thickness have been deposited on the perforate nickel-plated steel sheets, the same are removed from the electrolytic cell and placed in a bath of water which washes out any nitrate of nickel which may be present in the pores and on the surface of the films of nickel hydroxide.

The electrode elements produced as just described may now be assembled with suitable negative electrode elements such as those having electrolytically active finely divided iron as the active material, in a storage battery cell.

In order that my invention may be more clearly understood, attention is directed to the drawing accompanying and forming a part of this specification, and in which.

Figure 1:
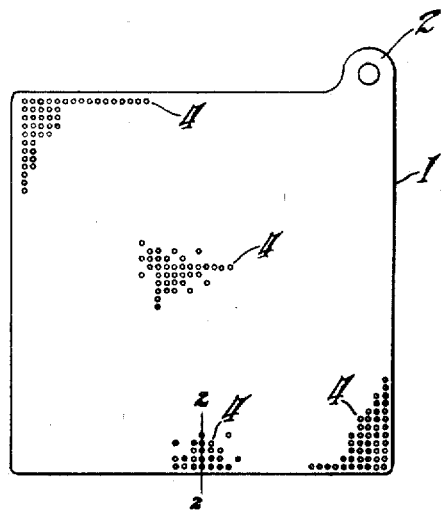
Figure 1 is a view in side elevation of a storage battery electrode element or plate in accordance with my invention.
Figure 2:
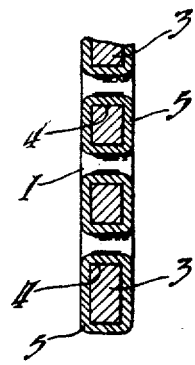
Figure 2 is a greatly enlarged fragmental sectional view taken on line 2—2 of Figure 1.

Referring to the drawing and especially to Figures 1 and 2, reference character 1 represents my improved storage battery electrode element or plate which is provided with the usual perforated ear or lug 2 to enable the same to be mounted on a plate supporting rod such as usually employed in storage batteries of the Edison type. The electrode element or plate 1 consists of a thin nickel-plated steel sheet 3 provided with small closely adjacent perforations 4 extending therethrough. While but comparatively few of these perforations are shown in the drawing, it is to be understood that practically the entire sheet is so perforated. All exposed surface portions of the sheet 3, including the walls of the perforations 4, are entirely covered with a thin coating or film 5 of nickel hydroxide electrolytically deposited thereon.

Figure 3:
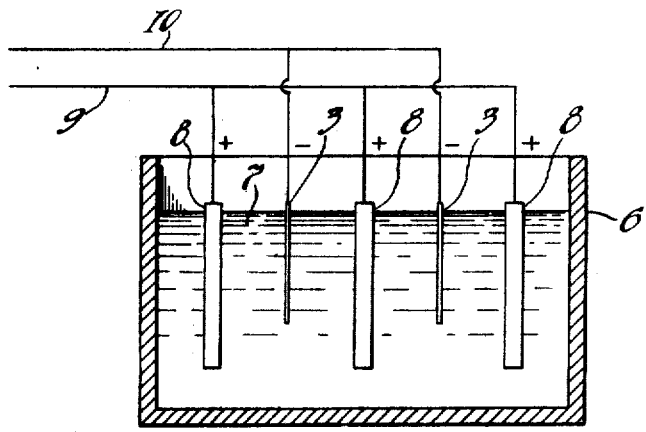
Figure 3 is a diagrammatic view in section of an electrolytic cell employed in producing electrolytically deposited films or coatings of a hydroxide on storage battery electrode or other elements in accordance with my invention.

The electrolytic cell employed in producing the films or coatings of nickel hydroxide on electrode elements such as just described (referring now to Fig. 3) comprises a suitable tank or receptacle 6 containing an electrolyte 7 consisting of a solution of nitrate of nickel or a solution of a mixture of a nickel salt and an oxidizing and plating agent such, for example, as a mixture of nickel sulphate and approximately 10% of nitrate of soda, anodes 8 composed of solid nickel and the thin metallic plates or sheets 3 to be coated as cathodes respectively disposed between and opposed to the anodes 8 in the electrolyte 7. The anodes 8 and cathodes 3 are suitably supported in the tank 6 and a pair of conductors 9 and 10 respectively connected with the anodes and cathodes serve to supply the cell with current from any suitable source (not shown). Upon passing a current through this cell, nickel hydroxide will be evenly deposited over the entire surface of each of the cathodes or nickel-plated steel sheets 3. After films or coating of nickel hydroxide of the desired thickness have been formed on the sheets 3, the latter are removed from the cell and placed in a bath of water which dissolves or washes out any nitrate of nickel present in the pores or on the surface of the films or coatings of nickel hydroxide. The sheets are then removed from the water bath and are ready for assembly in a storage battery cell.

While I have specifically described my invention as applied to the production of storage battery electrode elements, it is to be understood that the same is applicable to the production of elements for other purposes and that my invention is limited only as defined by the terms of the appended claims.

Having now described by invention, what I claim as new and desire to protect by Letters Patent is as follows:

1. A storage battery electrode comprising a conducting support having electrolytically deposited thereon as a cathode a coating or film of a hydroxide of a metal, substantially as described.

2. A storage battery electrode comprising a perforated metallic sheet having electrolytically deposited thereon as a cathode a coating or film of a hydroxide of a metal, substantiallly as described.

3. A storage battery electrode comprising a conducting support having electrolytically deposited thereon a coating or film of nickel hydroxide, substantially as described.

4. A storage battery electrode comprising a perforated metallic sheet having electrolytically deposited thereon a coating or film of nickel hydroxide, substantially as described.

5. A storage battery electrode comprising a thin perforated metallic sheet having electrolytically deposited thereon as a cathode a coating or film of a hydroxide of metal covering all exposed surface portions thereof, whereby such coating will be secured to said member by engagement with the outer surface portions thereof and the walls of said perforations, substantially as described.

6. A storage battery electrode comprising a member formed of steel having electrolytically deposited thereon a coating or film of a hydroxide of a metal, substantially as described.

7. A storage battery electrode comprising a perforated sheet of nickel plated steel having electrolytically deposited thereon a coating or film of nickel hydroxide covering all exposed surface portions thereof including the walls of said perforations, substantially as described.

8. The method of electrolytically coating a member with a hydroxide of a metal, which consists in employing such member as a cathode opposed to a suitable anode in an electrolyte consisting of a solution of a material capable of acting as an oxidizing and plating agent and containing a salt of such metal, and passing a current through the electrolytic cell, substantially as described.

9. The method of applying a coating of nickel hydroxide to a metallic member, which consists in employing such member as a cathode opposed to an anode of nickel in an electrolyte consisting of a solution of nitrate of nickel, and passing a current through the electrolytic cell, substantially as described.

10. The method which consists in employing a metallic member as a cathode opposed to an anode of nickel in an electrolyte consisting of a solution of nitrate of nickel, passing a current through the electrolytic cell, then removing the cathode from the cell and washing out the nitrate of nickel which is present on such cathode, substantially as described.

This specification signed and witnessed this 28th day of August, 1919.

THOS. A. EDISON.